(12) United States Patent
Skarzenski et al.

(10) Patent No.: US 6,712,576 B2
(45) Date of Patent: Mar. 30, 2004

(54) BATCH CHARGER FOR COLD TOP ELECTRIC FURNACE

(76) Inventors: Joseph Skarzenski, Apt. 404 - 111 Echo Drive, Ottawa, Ontario (CA), K1S 5K8; Witold S. Czastkiewicz, 6074 Pineglade Crescent, Orleans, Ontario (CA), K1W 1H1; Erkki Paivinen, 44 Putman Ave., Ottawa, Ontario (CA), K1M 1Z3

( * ) Notice: Subject to any disclaimer, the term of this patent is extended or adjusted under 35 U.S.C. 154(b) by 33 days.

(21) Appl. No.: 09/954,255

(22) Filed: Sep. 18, 2001

(65) Prior Publication Data

US 2003/0053891 A1 Mar. 20, 2003

(51) Int. Cl.[7] .................................................. C03B 3/00
(52) U.S. Cl. ........................................ 414/157; 414/180
(58) Field of Search ........................ 198/812; 414/147, 414/157, 165, 179, 180

(56) References Cited

U.S. PATENT DOCUMENTS

| | | | | |
|---|---|---|---|---|
| 2,649,978 A | * | 8/1953 | Smith | 414/180 |
| 3,352,406 A | * | 11/1967 | Long | 198/812 |
| 3,912,091 A | * | 10/1975 | Thompson | 414/196 |
| 3,935,941 A | * | 2/1976 | Keck | 198/812 |
| 4,036,625 A | * | 7/1977 | Holmes et al. | 65/136.2 |
| 4,367,618 A | * | 1/1983 | Focke | 53/234 |
| 5,637,183 A | * | 6/1997 | Borner | 156/547 |
| 6,129,196 A | * | 10/2000 | Lapper et al. | 198/313 |
| 6,247,581 B1 | * | 6/2001 | Oswald et al. | 198/812 |

* cited by examiner

*Primary Examiner*—Eileen D. Lillis
*Assistant Examiner*—Charles Fox

(57) ABSTRACT

A batch charger has a telescopic belt conveyor with a vertical take-up system for the belt when the conveyor retracts. The conveyor may pivot and/or shift laterally besides the furnace on a track. Fixed silos are positioned to refill an on conveyor bin while it is pivoting.

19 Claims, 8 Drawing Sheets

VIEW ON A - A

BATCH CHARGER FOR COLD TOP ELECTRIC FURNACE

FIELD OF THE INVENTION

This invention relates to an apparatus for delivering and distributing powdered materials over a surface. More particularly, it relates to the charging of a furnace eg. for the production of molten glass, with silica and the like by distribution of such materials over the upper surface of the melt. As a specific embodiment, the invention relates to a conveyor feed system that is configured to occupy a reduced floor area within a melt-shop. As a further embodiment the feed system is configured to deliver its charge while it is, itself, being refilled.

BACKGROUND TO THE INVENTION

In furnaces of the continuous feed type, particularly glass melters operating on a cold top basis, the charging of raw materials into the crucible must be effected in a controlled and evenly distributed manner. In glass furnaces, silica, lime and other components are continuously distributed over the top surface of the melt so as to provide a heat-conserving, insulative, upper layer floating on the melt. The level of this layer should be closely controlled to provide proper furnace operation. By adjusting the flow of current to electrodes within a furnace, the thickness and the rate of melting of the non-melted top-insulating layer should be maintained within target values over the entire top surface of the furnace. If the furnace has hot spots where melting is more rapid the rate of charge for such areas should be adjusted to maintain blanket thickness.

A consideration in the design of chargers for furnaces is the floor area available for operating the furnace. Most chargers extend outwardly beyond the periphery of the furnace, consuming valuable floor space. With longitudinally feed systems such as screw and belt conveyors, the external space occupied by the charger can approach and exceed the width of the top surface of the furnace. This situation arises from the need to extend and retract the screw or conveyor so that its discharge end can be located over all portions of the upper surface of the melt.

Chargers of this type can be located on a pivot to permit the discharge end of the conveyor to swing over the width of the topside surface. Or they may be mounted on a rail providing transverse displacement of a charger having a fixed orientation with respect to the furnace crucible. In either case, providing access to the full area of the topside surface of the melt is an essential requirement.

The extension of such charging apparatus over floor space adjacent to the furnace consumes valuable plant real estate. It would be highly desirable to provide a furnace charger, which is able to feed materials over the entire topside surface area of a furnace without consuming a substantial amount of floor area adjacent to the furnace. This invention addresses that objective.

A further concern in this art is the time that a conveyor spends in charging a furnace. Typically, conveyor systems carry an on-board supply of charging materials in a bin that must be refilled periodically. To refill this bin, such conveyor systems are moved to a refilling station. Presently, attendance at such a refilling station is "down-time" when the conveyor is not engaged in charging the furnace. A further object of the present invention is to reduce the proportion of down-time arising from refilling an on-conveyor supply bin.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims, which conclude this Specification.

SUMMARY OF THE INVENTION

According to the invention in one aspect, a charger for a furnace having a crucible with a topside surface over which is to be distributed charging materials includes a belt conveyor with a discharge end supported by a telescopic boom as part of a telescopic conveyor assembly. The charger is positioned on support means located along the periphery of the surface to be charged. This support means may comprise a pivoting base that allows the discharge end of the conveyor to be positioned over substantially the entire or greater part of topside surface to be charged. Or it may comprise a carriage mounted on a rail for moving the conveyor boom transversely along the periphery of the furnace. Such rotational or translational displacement combined with the extension and contraction of the telescopic boom enable the discharge end of the belt conveyor to be positioned over substantially the entire top surface of the furnace which is to be charged to the extent required for cold-top furnace operation.

To minimize the footprint of floor space adjacent to the furnace occupied by the charger, the conveyor belt along the periphery of the furnace is redirected vertically by a vertical take-up system. Thus the belt has a horizontal run for the greater part of the span of its extent over the surface of the melt; and a vertical extent for the length of its vertical take-up. Conveniently, the vertical take-up over-lies or is adjacent to the support means on the side remote from the furnace, limiting the extent to which the conveyor charger assembly extends horizontally beyond the furnace periphery when its discharge end is retracted to a position near to the support means. As the boom for the horizontal extension of the conveyor is telescopic, the extension of components of the charging system over valuable floor space is minimized when the conveyor is in its retracted position.

The belt take-up system may carry the taken-up portion of the belt in a generally vertical direction, while still tensioning the belt, (which is intended to be still running during take-up), through the use of weights, powered cylinders or the like which serve as tensioning means. Alternatively or additionally, the belt take-up system can impose on the belt a sinuous path of optionally variable amplitude, shortening the overall height of the belt take-up system.

The belt take-up system need not be located centrally over the support means. Allowing that it is desirable to counterbalance the torque on the support means that arises from the boom, particularly in its extended state, the belt take-up system can be located outwardly from the center of the support means. This will provide a counter-torque reducing the torque developed by the boom on the support means.

As one of the objects of the feed system is to provide for a continuous charging operation, a supply bin for the conveyor, carried by the charger system, may be replenished at regular intervals from a fixed supply silo source. Access to the supply silo can be intermittent so long as the on-charger supply bin is sufficiently filled to provide charge continuously to the conveyor. By providing a pivoting support means such recharging access to the supply silo can be made conveniently available when the charger is in a specific location. Thus refilling of the supply bin can occur while the telescopic boom is engaged in extending or contracting and/or pivoting in the course of distributing a charge over the melt.

In the case of a charging system relying on a rail-supported travelling carriage moving along one axis -y- as the support means, two reloading stations with two supply silos may be provided. These may be provided at the two outer ends of the carriage tracks. Replenishment of the on-charger supply bin can thereby be effected while the furnace is being fed from either one of the ends of the carriage tracks.

Combined with a charging system incorporating a pivoting support means, two such end-located silos may recharge the on-charger supply bin while the pivoting support means is delivering a charge over virtually all of the surface of the melt. In this manner "down-time" is minimized to nearly its absolute limit.

The foregoing summarizes the principal features of the invention and some of its optional aspects. The invention may be further understood by the description of the preferred embodiments, in conjunction with the drawings, which now follow.

DESCRIPTION OF THE PREFERRED EMBODIMENT

Figure 1:
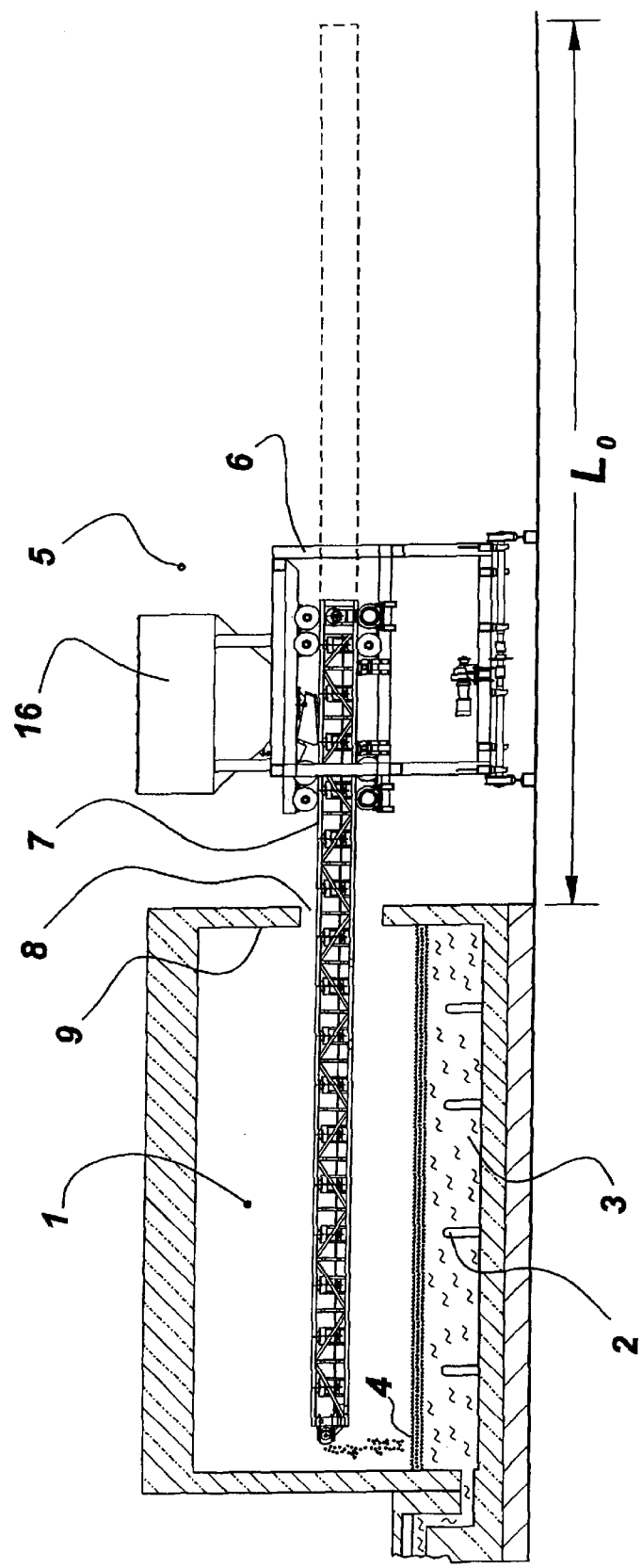
FIG. 1 is a schematic side view of a prior art conveyor-type charger with a non-telescopic boom in the retracted (dotted) and advanced (solid) positions.

In FIG. 1 a furnace 1 has electrical heating electrodes 2 embedded in a hot silica melt 3. Over the top surface of the melt 3 is a powder blanket or crust of dry charging material 4.

Along a side of the furnace 1 a prior art charging assembly 5 includes a rail-mounted carriage 6, a retractable prior art conveyor 7 and an on-carriage storage bin 16 for feeding charging material to the prior art conveyor 7.

The prior art conveyor 7 may be advanced as in FIG. 1 or retracted as shown in dotted outline to extend over the entire surface of the melt 3. Access to the melt 3 is provided by a sidewall slot 8 in the wall 9 of the furnace 1. The carriage 6 allows the prior art conveyor 7 to shift laterally across the surface of the melt 3. The prior art conveyor 7 in FIG. 1 is non-telescopic.

FIG. 1 represents a prior art system wherein extended space must be provided adjacent the furnace wall 9 for the charging system to extend and withdraw the conveyor 7 over the span of the melt 3 surface. The space occupied adjacent the furnace is designated by the length "$L_o$."

Figure 2:
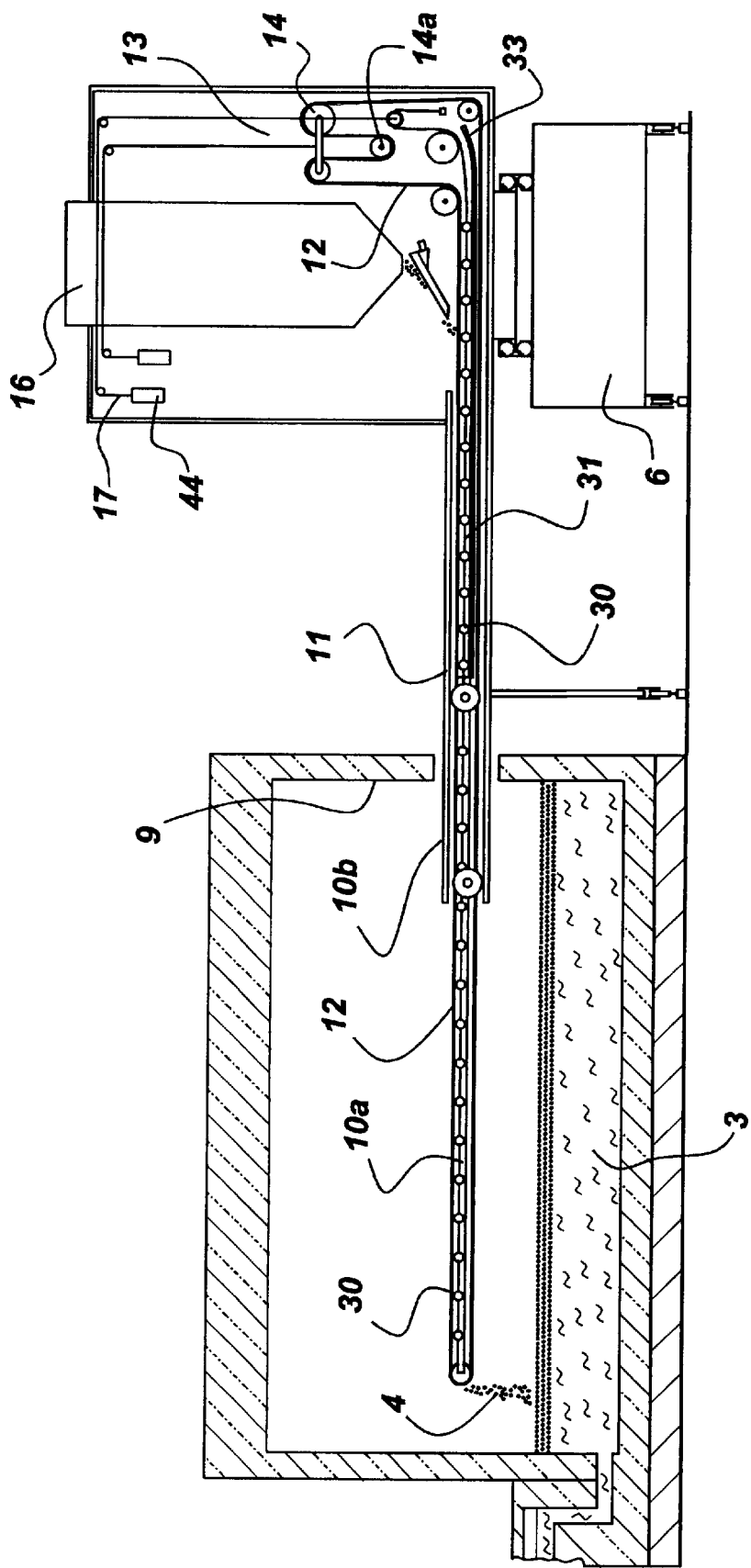
FIG. 2 is a schematic side view of a modified charger from that of FIG. 1 wherein the boom is a two-part telescopic unit in the fully advanced position.

In FIG. 2 a telescopic conveyor assembly 11 with a telescopic boom according to the invention is shown. In this case the carriage 6 is removed partially back from the furnace wall 9 and access to the surface of the melt 3 is obtained by extension and retraction of the travelling boom portion 10a of the telescopic conveyor 11 assembly.

The travelling boom 10a is carried by the support boom lob and includes an endless circulating belt 12. Within both the travelling and support booms are conveyor support rollers 30. While the conveyor support rollers 30 within the travelling boom 10a may be fixed through bearings to the travelling boom 10a, the rollers 30 within the support boom 10b are linked as by link bars 31, chains or the like, and are carried by side roller bearings 32 constrained within tracks 33 within the support boom 10b that allow the rollers 30 to be shifted along the tracks 33.

Figure 3:
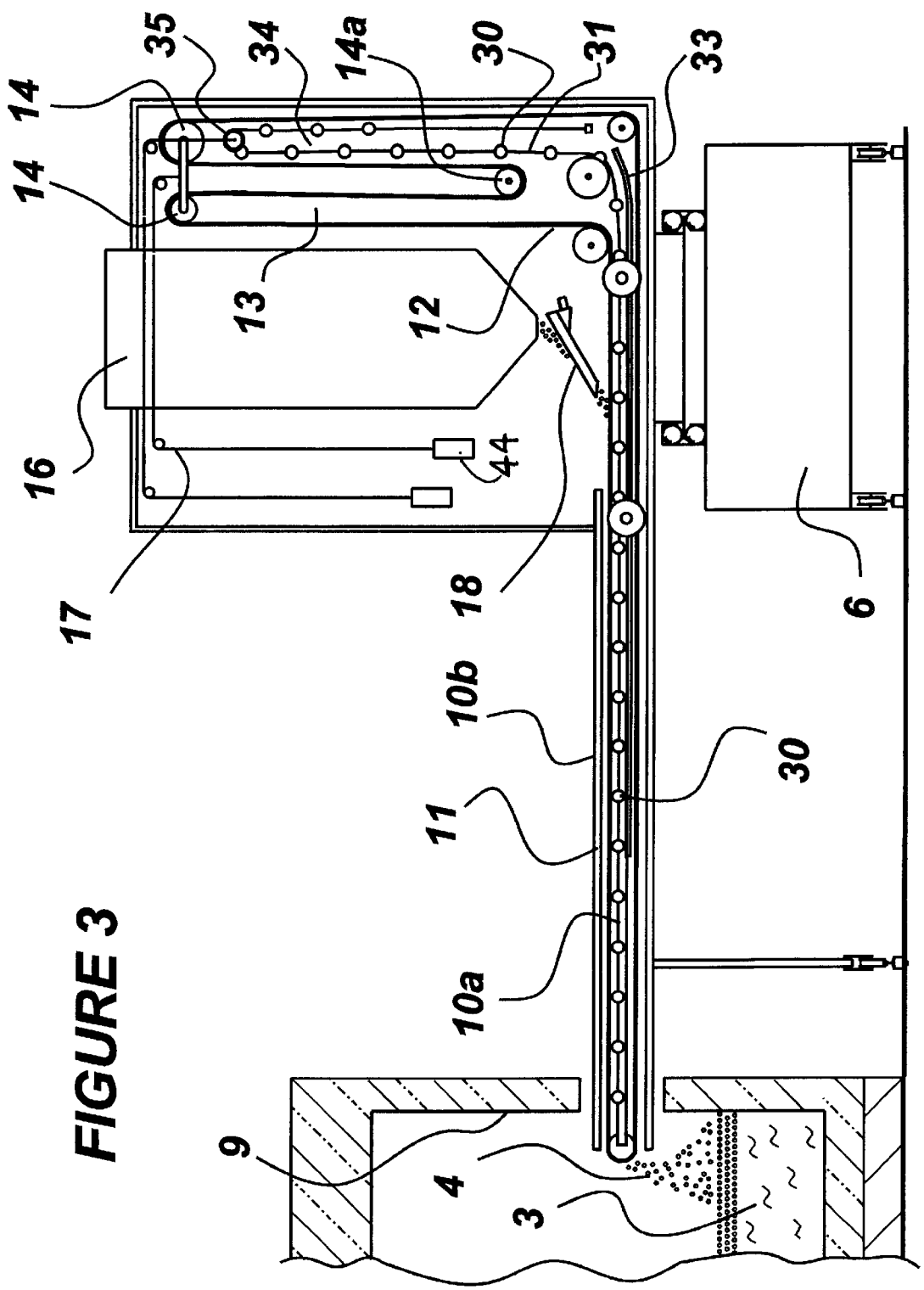
FIG. 3 is a schematic detailed side view of the charger showing a vertical take-up for the conveyor belt and conveyor rollers.
Figure 3A:
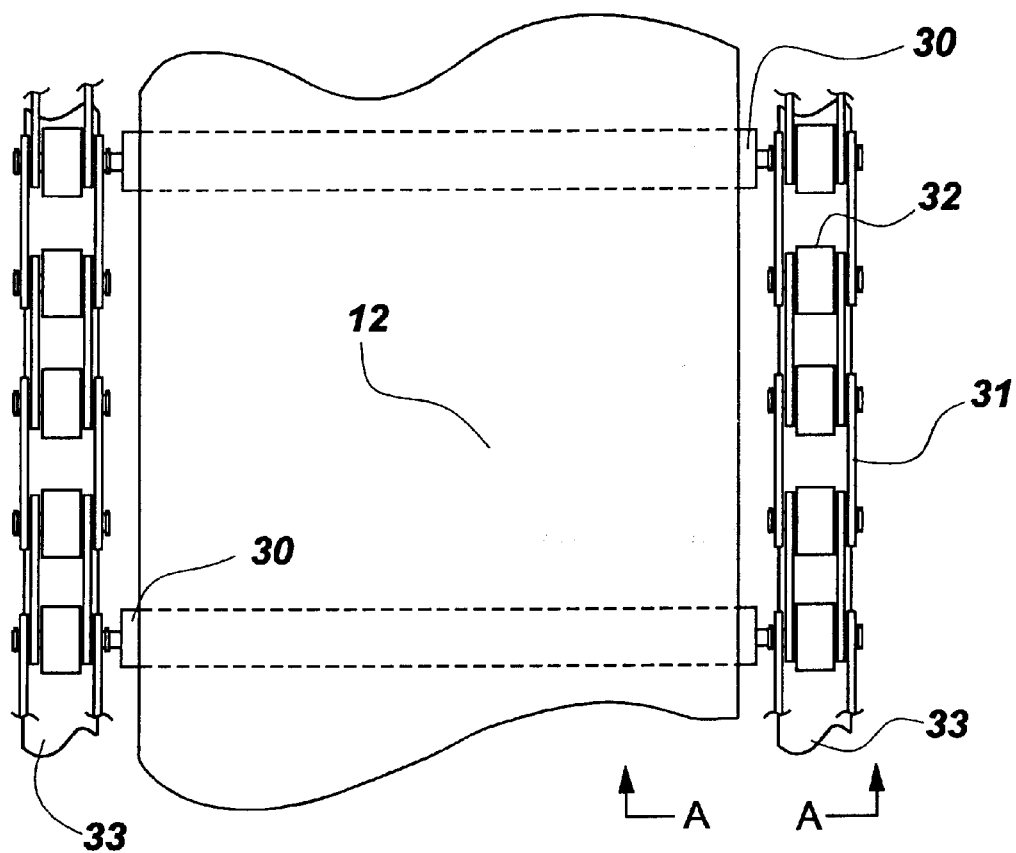
FIG. 3A is a plan view of the roller system supporting the belt of the conveyor.
Figure 3B:
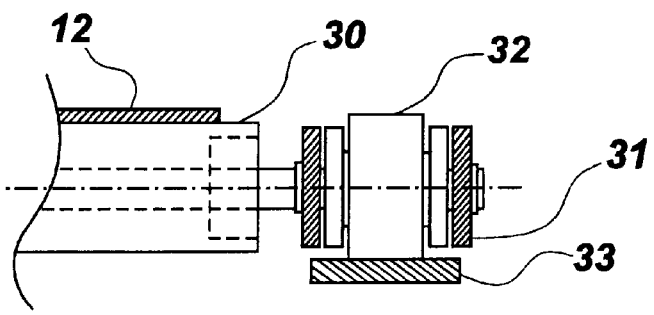
FIG. 3B is a partial face view of the roller system of FIG. 3A, in position beneath a conveyor belt.

Upon retraction of the travelling boom 10a the belt 12 is redirected vertically into a belt-take up system 13 as shown in FIGS. 2 and 3. Within this system 13 the belt 12 optionally passes sinuously over take-up rollers 14, 14a.

The axes of the vertically displaceable take-up rollers 14 are displaceably mounted within guides (not shown) to allow for their vertical displacement. Tensioning means such as weights 44, springs (not shown) or the like are connected through cables 17 to the take-up rollers 14, drawing on the take-up rollers 14 to maintain tension in the belt 12. The belt take-up system 13 permits the belt 12 to pass there-through under continuous tension while the conveyor assembly 11 delivers charge material 4 to the melt 3 surface.

When the travelling boom 10a is retracted, the conveyor support rollers 30 must be accommodated. A roller vertical take-up system 34 may be provided with a lifting shaft 35 positioned to draw the support rollers 30 upwardly. As the conveyor belt 12 is drawn vertically by the belt take-up system 13, the support rollers 30 are simultaneously drawn upwardly, nested within one portion of the sinuously deployed belt 12, of FIG. 3.

Mounted on the carriage 6 is an on-carriage bin 16 that supplies charge material 4 to the belt 12 through a feed tube 18 by gravity flow or equivalent delivery means. The top of the on-carriage bin 16 is open to permit this bin 16 to be refilled.

Figure 4:
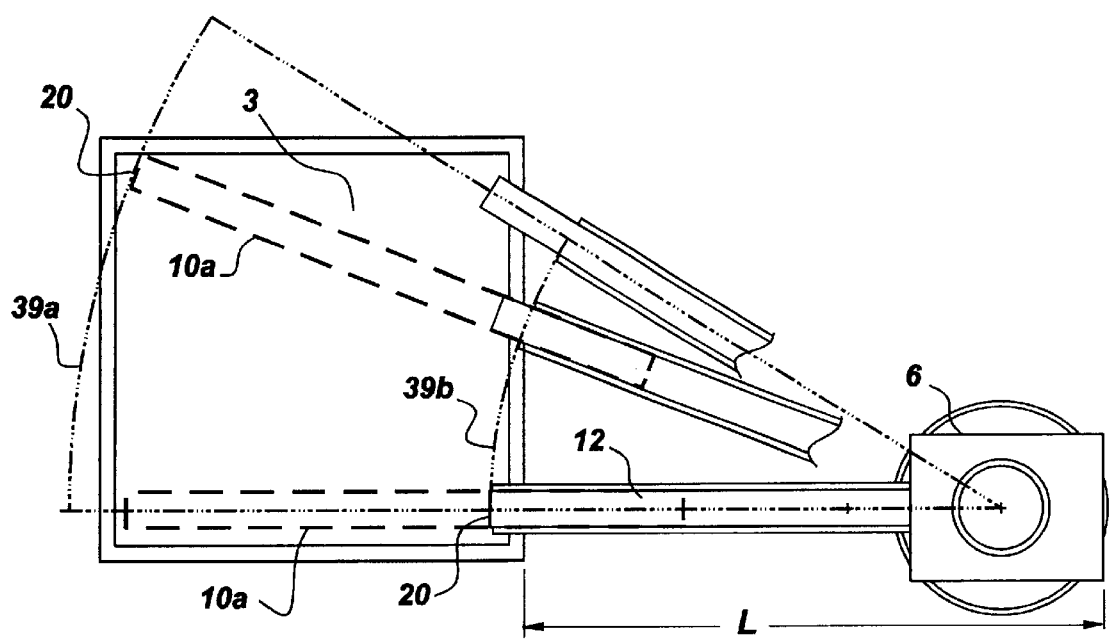
FIG. 4 is a schematic plan view of the view of FIG. 3 wherein the conveyor assembly is pivotally mounted showing sufficient span for the charging coverage to cover substantially the entire furnace top surface achievable by both pivoting the conveyor assembly and extending the telescopic boom over its full range.

In FIG. 4 a pivoting version of the charging system of FIG. 2 is shown in plan view with the travelling boom 10a extended to its limit in dotted outline and fully retracted in solid outline. A pivoting telescopic charger mounted at a single location at a corner on one side of a furnace is shown as having virtually full access to the surface of the melt 3 within the arcs 39a, 39b defined by the end 20 of the conveyor belt 12 when fully extended and retracted. The approximate outward extent of the charger from the furnace 1 in FIG. 4 is indicated by "L".

Figure 5:
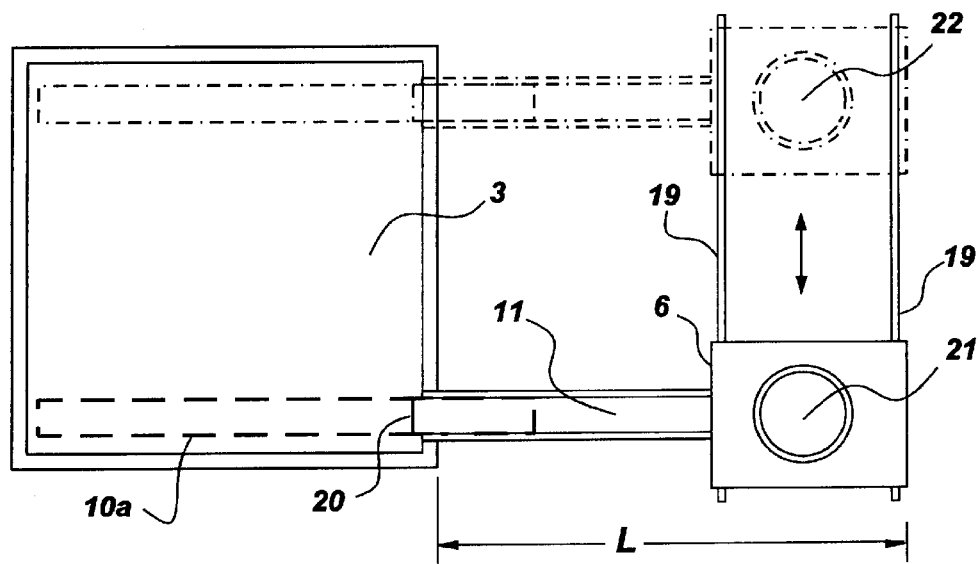
FIG. 5 is a system wherein the conveyor assembly of FIG. 4 can be shifted along a furnace-side track to an alternate corner location whereby the entire furnace surface can be accessed by the charger without any pivoting of the conveyor.

In FIG. 5 a non-pivoting carriage 6 (in solid outline) is positioned at the limit of a laterally-extending track 19 permitting the end 20 of the travelling boom 10a to extend fully along one side boundary of the melt 3 surface. Using the laterally extending track 19, the telescopic conveyor assembly 11 can, by being repositioned along the track, access the entire top surface of the melt 3 without any provision for the assembly 11 to swing or pivot. Again, the approximate extension of the translationally positioned charging system of FIG. 5 beyond the side of the furnace 1 is indicated by "L".

Figure 6:
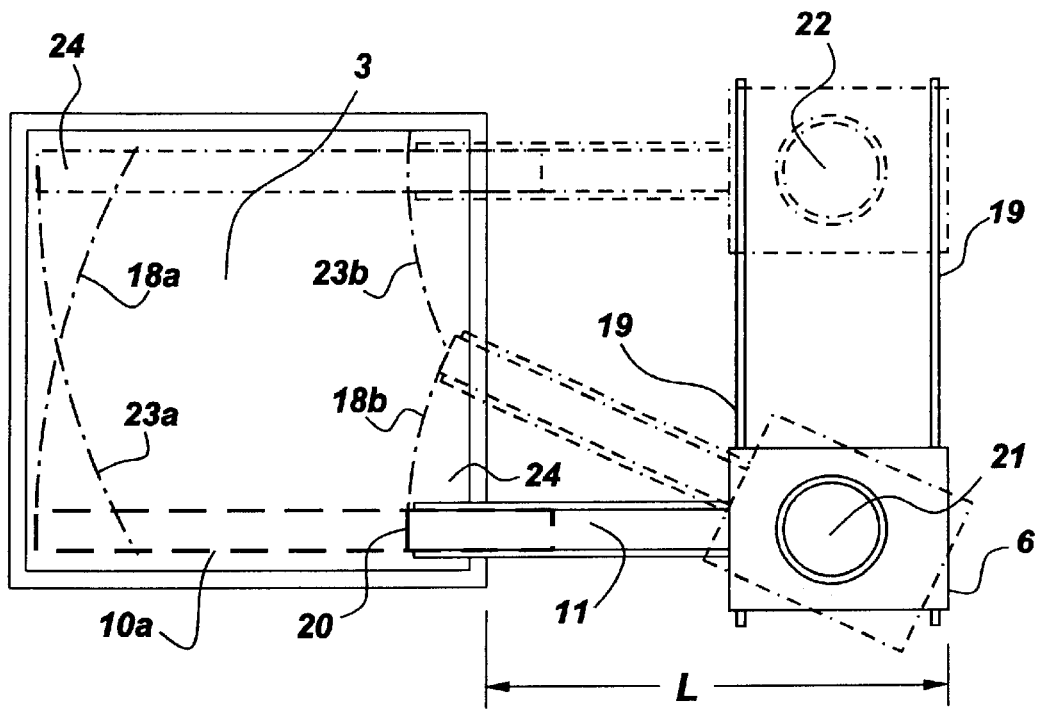
FIG. 6 is a schematic plan view of a conveyor assembly as in FIG. 4 wherein the end of the conveyor belt has access to the entire topside surface of the furnace through a combination of pivoting and translation along the track.

In FIG. 6 access to the surface of the melt 3 is achieved by a combination of pivoting and lateral translation of the conveyor assembly 11. The surface of the melt 3 accessed from a first corner location 21 in FIG. 6 spans less than the full surface area of the melt 3. Two arcs 18a, 18b are shown representing the path of the end 20 of the pivoting travelling boom 10a in its extended and retracted configuration respectively based on the corner location 21. Area 24 is not accessible from location 21. Coverage of virtually all of the balance of the entire surface may be achieved by the shifting the telescopic conveyor assembly 11 along the track 19 to the opposite side of the furnace 1 to another, second, position 22. This is shown (schematically) in FIG. 6 by the (dotted) circular outline of the on-carriage bin 16 and conveyor assembly 11. From this second position 22, the end 20 of the travelling boom 10a may swing over extended and retracted arcs 23a, 23b that permit access to the non-directly accessible area 24 on the surface of the melt 3 not accessed from the first position 21. Extension of the charging system of FIG. 6 beyond the side of the furnace as depicted is indicated by "L".

Taking the outward extension length "$L_o$" of a standard, non-telescopic conveyor (as in FIG. 1) as 100%, normalizing to a standard square furnace size and assuming as an example that the travelling boom 10a and support boom lob overlap by 20% when the travelling boom 10a is fully extended, the configuration of FIG. 4 occupies an extension length "L" that is 87% of that of FIG. 1. Without the pivoting feature and relying on displacement of the carriage 6 as in FIG. 5 the value of "L" would be 70% of $L_o$. The value of L for FIG. 6 is 62% of $L_o$. Thus substantive and progressive reductions in the floor-space occupied by the charging system have been demonstrated.

Figure 7:
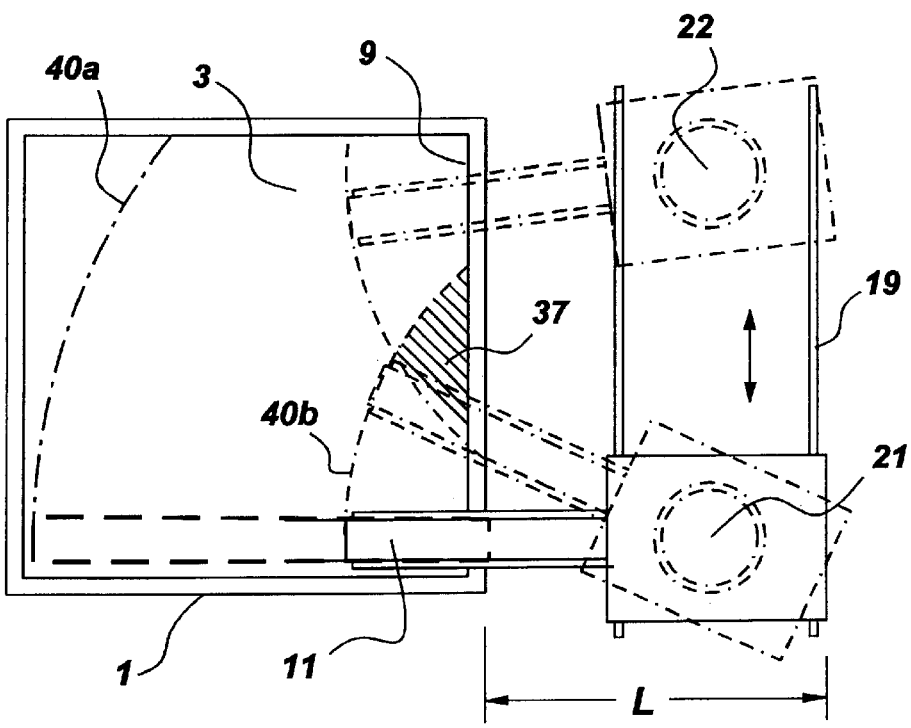
FIG. 7 is a schematic plan view as in FIG. 6 wherein the end of the conveyor has access to only 90% of the topside surface of the furnace.

A further reduction in L can be achieved by moving the track 19 even closer to the furnace 1 so that arcs 18b and 23b fall short of full coverage of the melt 3, creating an inaccessible zone 37 on the surface of the melt. This is shown in FIG. 7. By permitting an inaccessible zone 37 to exist that extends inwardly from the furnace wall 9 by, for example, 10% of the width of the (square) melt 3 surface, the track 19 may be closed-up towards the side of the furnace 1 to reduce the outward extension length "L" in FIG. 7 to % of the value of $L_o$.

The inaccessible zone 37 of FIG. 7, defined in part by arc 40b, is of such a limited size as will not, under normal conditions, impair the operation of a cold-top electric furnace because of the capacity of the charging material 4 on the surface of the melt 3 to redistribute itself due to thermal convection currents within the melt 3 as the charging material 4 floats on the molten glass surface.

The degree to which such an inaccessible zone 37 may be permitted can be adjusted to the circumstances under which presence of a moderate "hot spot" can be tolerated.

Figure 8:
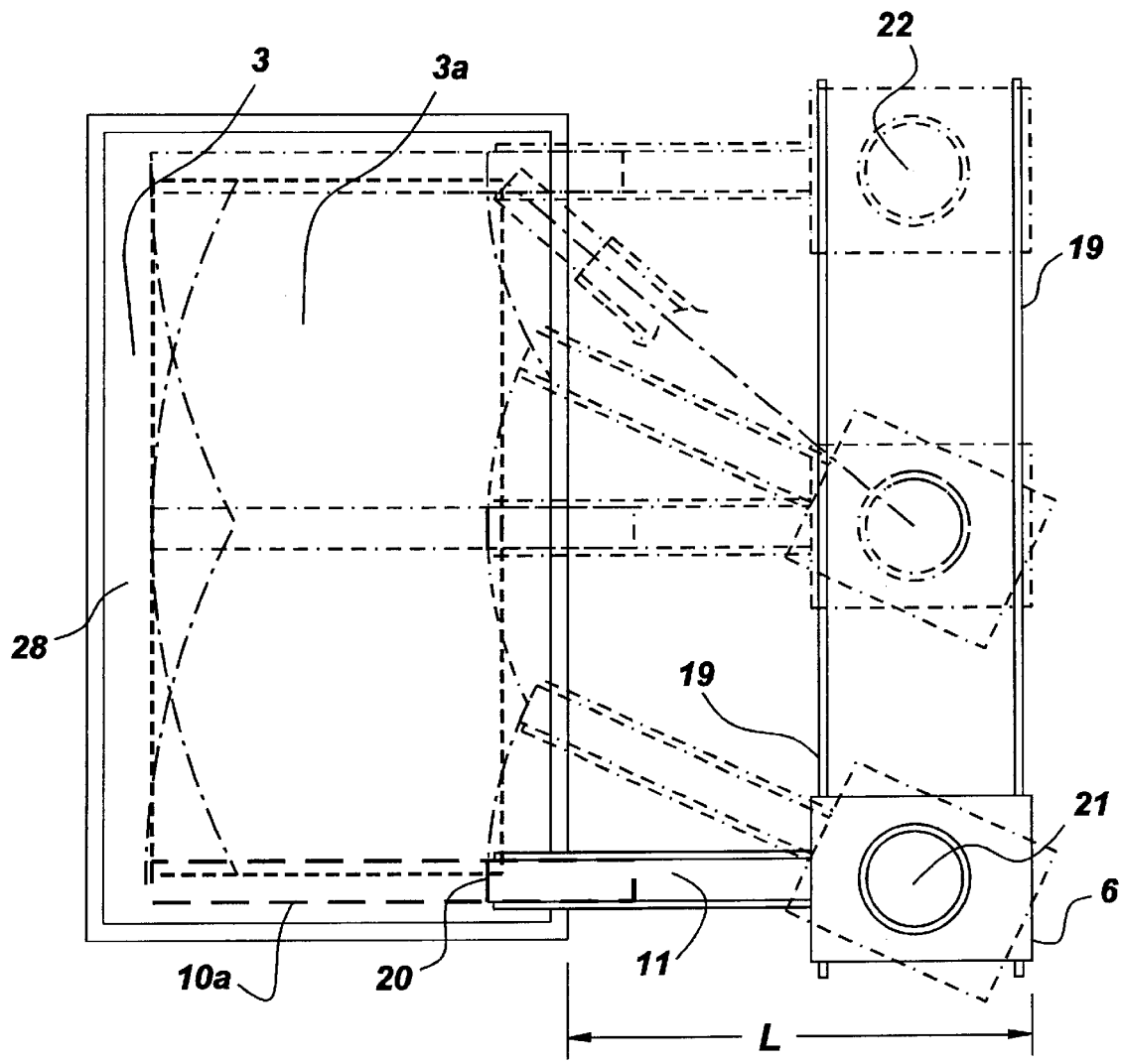
FIG. 8 is a plan view of a pivoting and translating conveyor assembly delivering a charge to an inner region on the upper surface of a furnace melt.

In FIG. 8 the furnace 1 is rectangular, rather than square, as in FIGS. 4 to 7. FIG. 8 shows a rectangle with a 2:1 ratio. A higher ratio is possible, but the travel time to traverse the larger dimension should be limited to ensure that blanket replacement occurs relatively promptly.

The space savings advantage of FIG. 6 is not affected by stretching the square of FIG. 6 into a rectangle.

Although the end 20 of the belt 12 is shown in FIGS. 4 to 7 as spanning the full width of the furnace 1 from wall to wall, this was depicted for illustrative purposes. The end 20 of the belt 12 need not, however, extend fully to the furnace walls 9. Instead, as shown for FIG. 8, the end 20 of the conveyor assembly 20 can access an inner portion 3A of the surface of the melt, bounded by a non-directly accessible border 28 that is not precisely accessible for direct delivery of charging material 4. Nevertheless, the ability of the charging material 4 to redistribute itself locally over the surface of the melt 3 will allow the border 28 to be adequately supplied with a charge. Further, it is highly desireable to avoid feeding the charge 4 against the furnace walls 9 as this will wear the refractory lining of such walls 9.

The value for "L" in FIG. 8, wherein reliance is placed on self-redistribution of the charging materials, is similarly reduced from the value of $L_o$ as achieved in FIGS. 6 and 7.

Figure 9:
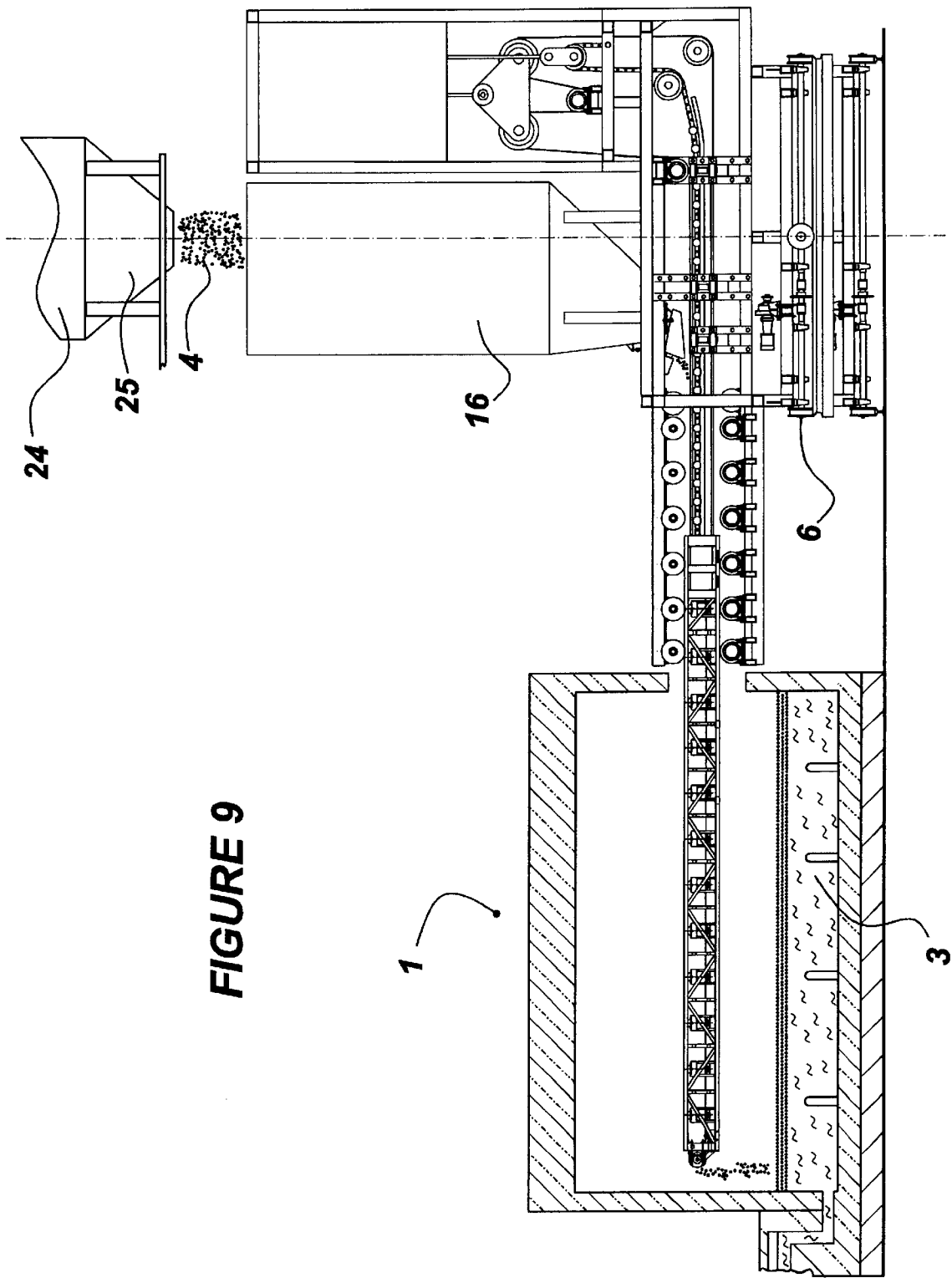
FIG. 9 is a schematic side view of the charger of FIG. 4 showing a corner-located stationary silo serving as a supply bin accessing an on-conveyor bin to refill the on-conveyor bin with charge material.

In FIG. 9 a stationary supply bin 24 is shown feeding charge material 4 to the on-carriage bin 16 through a conduit 25 which terminates at a delivery point which is above the center of rotation for the pivoting carriage 6. This stationary supply bin 24 may be located conveniently at a recharging station 21 or 22 as in FIGS. 6 and 7 from which the pivoting telescopic conveyor assembly 11 may cover substantial portions of the surface of the melt 3. This will allow time for the on-carriage bin 16 to be refilled. Areas of the melt surface not accessed from the recharging stations 21 and 22 may be accessed by the translational shifting of the carriage 6 to intermediate locations, relying on the on-carriage bin 16 to supply charge material 4 to the conveyor assembly 11 during the off-station furnace charging interval.

A major advantage of supplying charging material 4 to the melt 3 by way of a pivoting action delivered from two base locations 21, 22 is that the system can, for most of its operation, deliver charging material 4 to the melt 3 while the on-carriage bin 16 is being charged from a stationary supply bin 24. By using dual stationary supply bins positioned to render the first 21 and second 22 end positions of FIG. 6 as charging stations, the time during which the on-carriage bin 16 is not being recharged can be reduced to a minimum while, at the same time, optimizing the space consumed by the batch charger system of the invention.

In the foregoing disclosure various motors and controls will be present in order to operate the conveyor, the belt take-up system, the telescopic boom and the rail carriage, etc. Not shown for purposes of simplication, their incorporation into the system will be apparent to those skilled in the art.

On the basis of the foregoing arrangement, a new and more compact charging system may be constructed for charging a surface such as that of a furnace with charging material.

CONCLUSION

The foregoing has constituted a description of specific embodiments showing how the invention may be applied and put into use. These embodiments are only exemplary. The invention in its broadest, and more specific aspects, is further described and defined in the claims which now follow. These claims, and the language used therein, are to be understood in terms of the variants of the invention which have been described. They are not to be restricted to such variants, but are to be read as covering the full scope of the invention as is implicit within the invention and the disclosure that has been provided herein.

The embodiments of the invention in which an exclusive property or privilege is claimed are defined as follows:

1. A charger for a furnace having a melt with a topside surface over which is to be distributed charging materials comprising:
   1) a belt conveyor with a discharge end supported by a telescopic conveyor support assembly and carried on pivoting support means located laterally to the surface to be charged;
   2) a belt within said belt conveyor which belt has a horizontal run over the surface of the melt and a vertical extent proximate to the support means whereby the belt is redirected vertically;
   3) a vertical take-up system to support and maintain tension within the belt while it is redirected vertically while running; and
   4) an on-conveyor supply bin for the telescopic conveyor assembly, positioned to deliver charging materials to the belt conveyor and
   5) fixed supply bin refill means comprising a silo for refilling the on-conveyor supply bin.

2. A charger as in claim 1 comprising take-up rollers within the vertical take-up system and weights coupled to such rollers to maintain tension on the belt.

3. A charger as in claim 1 wherein the belt within the take-up system follows a sinuous path to thereby shorten the overall height of the belt take-up system.

4. A charger as in claim 1 wherein the belt take-up system is positioned outwardly from the center of the support means on the side opposite the boom to provide a counter-torque, reducing the torque developed by the boom on the support means.

5. A charger as in claim 1, wherein the fixed supply bin refill means is positioned to supply charging materials to the on-conveyor supply bin while the telescopic conveyor assembly is engaged in distributing charging materials over the top-side surface of the crucible.

6. A charger as in claim 5 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

7. A charger as in claim 5 wherein the fixed supply bin refill means is a first supply bin refill means and wherein the support means is mounted on tracks for traversing of the telescopic conveyor along the side of the furnace with the first supply bin refill means at one end of said tracks, there being a second fixed supply bin refill means provided at the other end of the tracks to permit the supply of charge to be delivered to the on-conveyor supply bin at two locations.

8. A charger as in claim 7 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

9. A charger as in claim 1 comprising a rail system carrying the support means for moving the telescopic conveyor support assembly transversely along the periphery of the furnace whereby such translational displacement of the support means along the rail system, combined with the extension and contraction of the telescopic conveyor assembly, enable the discharge end of the belt conveyor to deliver charging material b over the surface of the melt which is to be charged.

10. A charger as in claim 9 wherein the discharge end of the belt conveyor may be positioned over substantially the entire topside surface of the melt which is to be charged.

11. A charger as in claim 10 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

12. A charger as in claim 9 wherein the discharge end of the belt conveyor may be positioned over up to at least 90% of the entire topside surface of the melt which is to be charged.

13. A charger as in claim 12 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

14. A charger as in claim 9 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

15. A charger as in claim 1 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

16. A charger for a furnace having a melt with a topside surface over which is to be distributed charging materials comprising:
   1) a belt conveyor with a discharge end supported by a telescopic conveyor support assembly and carried on pivoting support means located laterally to the surface to be charged;
   2) a belt within said belt conveyor which belt has a horizontal run over the surface of the melt and a vertical extent proximate to the support means whereby the belt is redirected vertically;
   3) a vertical take-up system to support and maintain tension within the belt while it is redirected vertically while running;
   4) an on-conveyor supply bin for the telescopic conveyor support assembly, carried by the support means and positioned to deliver charging materials to the belt conveyor, and
   5) rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted,
   wherein the support means is mounted on tracks with two outer ends, the charger comprising two fixed supply silos respectively provided at the two outer ends of the tracks to permit the supply of charge to be delivered to the on-conveyor supply bin at two locations while the telescopic conveyor support assembly is engaged in distributing charging materials over the top-side surface of the crucible.

17. A charger for a furnace having a melt with a topside surface over which is to be distributed charging materials comprising:
   1) a belt conveyor support with a discharge end supported by a telescopic conveyor assembly and carried on pivoting support means located laterally to the surface to be charged;
   2) a belt within said belt conveyor which belt has a horizontal run over the surface of the melt and a vertical extent proximate to the support means whereby the belt is redirected vertically;
   3) a vertical take-up system to support and maintain tension within the belt while it is redirected vertically while running, wherein the support means is positioned so that, with pivoting combined with the extension and contraction of the telescopic conveyor support assembly, the discharge end of the belt conveyor will be positionable over substantially the entire topside surface of the melt which is to be charged.

18. A charger as in claim 17 comprising rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

19. A charger for a furnace having a melt with a topside surface over which is to be distributed charging materials comprising:
   1) a belt conveyor with a discharge end supported by a telescopic conveyor support assembly and carried on support means located laterally to the surface to be charged;
   2) a belt within said belt the conveyor which belt has a horizontal run over the surface of the melt and a vertical extent proximate to the support means whereby the belt is redirected vertically;
   3) a vertical take-up system to support and maintain tension within the belt while it is redirected vertically while running and
   4) rollers to support the belt conveyor, a portion of which rollers are to be elevated, the rollers to be elevated being interconnected by articulated links and wherein the charger includes a roller-take-up system to elevate said portion of the rollers vertically when the telescopic conveyor assembly is retracted.

* * * * *

UNITED STATES PATENT AND TRADEMARK OFFICE
CERTIFICATE OF CORRECTION

PATENT NO.    : 6,712,576 B2
DATED         : March 30, 2004
INVENTOR(S)   : Joseph Skarzenski, Witold Czastkiewicz and Erkki Paivinen It is certified that error appears in the above-identified patent and that said Letters Patent is hereby corrected as shown below:

<u>Title page,</u>
Item [73], Assignee, should read
-- Ottawa Fibre Inc.
   1365 Johnston Road
   Ottawa, Canada KIV 8Z1 --

<u>Column 8,</u>
Line 6, the spurious letter "b" has been removed.

Signed and Sealed this

Twentieth Day of July, 2004

JON W. DUDAS
*Acting Director of the United States Patent and Trademark Office*